United States Patent [19]

Thorley

[11] 4,027,807
[45] June 7, 1977

[54] WHEELCHAIR LIFT

[75] Inventor: Graham R. Thorley, San Diego, Calif.

[73] Assignee: Transportation Design & Technology, San Diego, Calif.

[22] Filed: Aug. 20, 1975

[21] Appl. No.: 606,137

[52] U.S. Cl. .............................. 214/75 R; 105/430; 105/448; 280/166; 296/62
[51] Int. Cl.² .................... B60R 3/02; B61D 23/02; B62D 25/22
[58] Field of Search ............ 214/75 R, 75 G, 75 T, 214/75 H, 730; 296/61, 62; 280/163, 164, 166; 105/443, 444, 445, 447, 448, 449, 430; 52/182, 183, 184; 187/10

[56] References Cited

UNITED STATES PATENTS

| | | | |
|---|---|---|---|
| 461,156 | 10/1891 | Barber | 105/447 |
| 775,366 | 11/1904 | Kratz | 105/447 X |
| 3,516,559 | 6/1970 | Walter | 214/75 R |
| 3,528,573 | 9/1970 | Denner | 280/164 R |
| 3,572,754 | 3/1971 | Fowler | 280/166 |
| 3,651,965 | 3/1972 | Simonelli et al. | 214/75 T X |
| 3,847,292 | 11/1974 | Williams et al. | 214/75 G |
| 3,853,369 | 12/1974 | Holden | 296/62 |
| 3,874,527 | 4/1975 | Royce | 296/61 |
| 3,906,690 | 9/1975 | Miriani | 52/184 |
| 3,912,048 | 10/1975 | Manning | 214/75 R |
| 3,913,497 | 10/1975 | Maroshick | 280/166 |
| 3,918,596 | 11/1975 | Ward | 214/75 R |

*Primary Examiner*—L. J. Paperner
*Assistant Examiner*—Carl Rowold
*Attorney, Agent, or Firm*—Isbell & Charmasson

[57] ABSTRACT

A lift device particularly suitable for lifting handicapped persons with or without wheel chairs into a vehicle or building. The lift can be incorporated into the doorway of any given vehicle, or into any step structure within a building. The lift in its stowed position forms the normal steps. The various step elements are moveable and can cooperate to form a platform which can be lowered or raised to any position between the upper and lower level of the steps. A ramp normally hidden under the steps slides forward to allow easy access to the extended platform and a safety flap housed in the ramp flips upward to form an angle stop preventing the wheel chair from rolling backward during platform motion.

3 Claims, 9 Drawing Figures

WHEELCHAIR LIFT

BACKGROUND

This invention relates to loading mechanisms, and, more particularly, to lift devices suitable for loading handicapped persons with or without wheel chairs into vehicles such as buses or other types of public conveyances. It also relates to lift devices suitable for helping such persons in negotiating steps at the entrance of, or within, a building.

Lift devices which in the past were designed for vehicular use, were relatively bulky and cumbersome, taking up a great deal of space in the interior of such vehicles. It is clearly preferable to have the lift devices completely contained in the vehicles when such vehicles are in motion; however, the large size of the lift mechanisms has often necessitated external location of at least a portion of such equipment. The vehicle cargo capacity has often been greatly reduced by the portion of the lift mechanism located inside the vehicle.

Furthermore, the size and complexity of such lift mechanisms often required that a spherical opening be cut into the side of the vehicle, in addition to the normal entrances, in order to accomodate the lifts.

Lift mechanisms designed to help handicapped persons in negotiating steps at the entrance of, or within, a building which have been provided up to the present time have been relatively bulky and unsightly. These devices often interfere with the common use of the steps by normal people, and may require the opening of special doors or the installation of special ramps in addition to the normal entrances and stairways. The proposed lift device in its stowed position can act as the normal step structure and be completely hidden within it.

SUMMARY

The lift device can be incorporated into any doorway entrance of vehicles suitable for either public or private conveyance. The lift in its stowed position forms the normal entrance steps and, when required, can either be operated by the driver, without his moving from the driving position, or by the handicapped person himself from the entry location. The various step elements change into a platform which can be lowered, or raised, to any position between vehicle floor height and ground level. The present invention may also be installed within other types of step structures, such as those found in split level homes, at the entance of a building or as part of a loading dock.

DESCRIPTION OF THE PREFERRED EMBODIMENT

As an example of one embodiment of this invention, there is shown a wheelchair lift device mounted within the stairway structure at the entrance of a public transportation vehicle.

Figure 1:
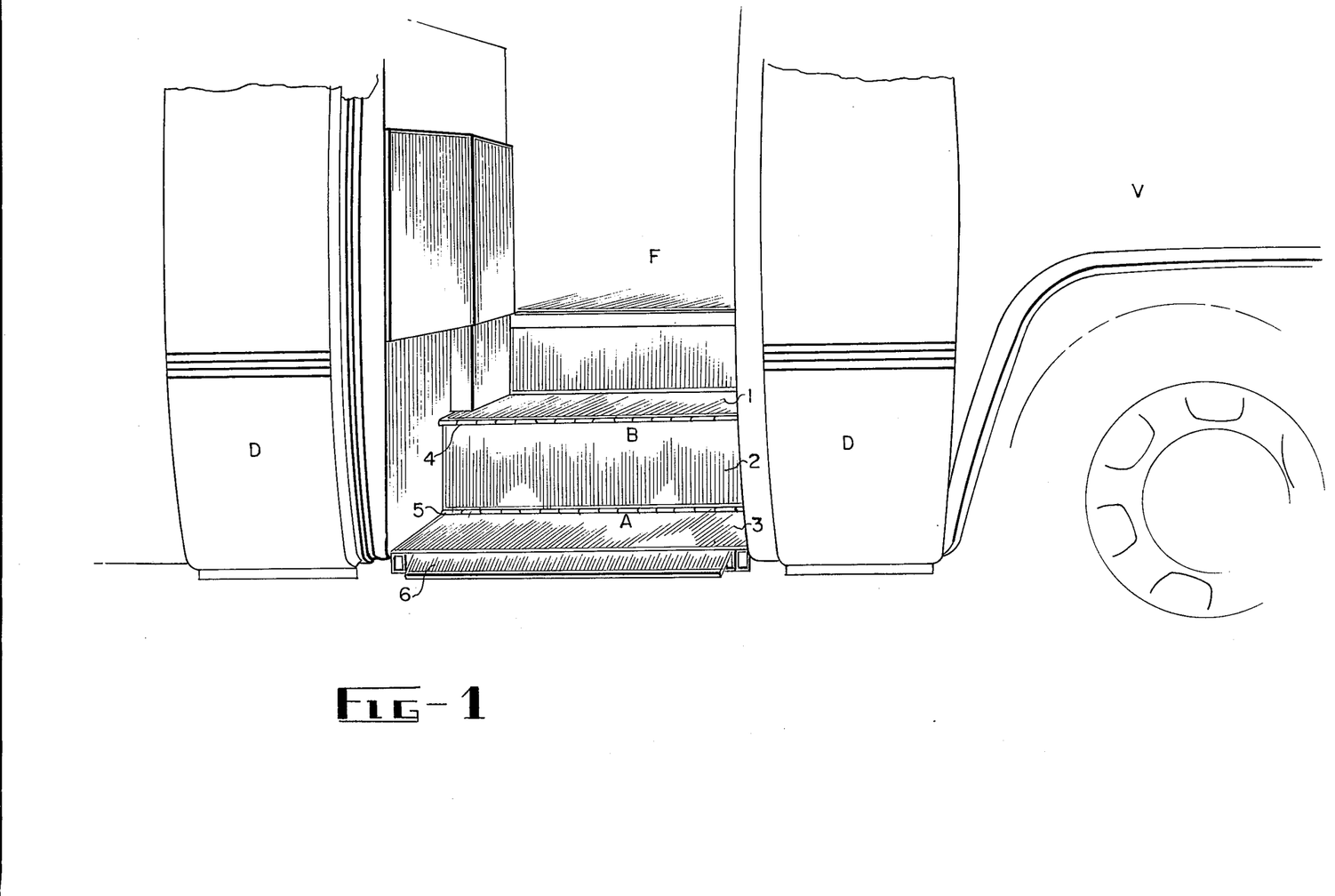
FIG. 1 is a perspective view showing the invention installed in the entrance of a public transportation vehicle inthe stowed position.

In FIG. 1 the lift device is its stowed position forms two of the steps (A and B) of the entrance stairway of a vehicle V.

Figure 2:
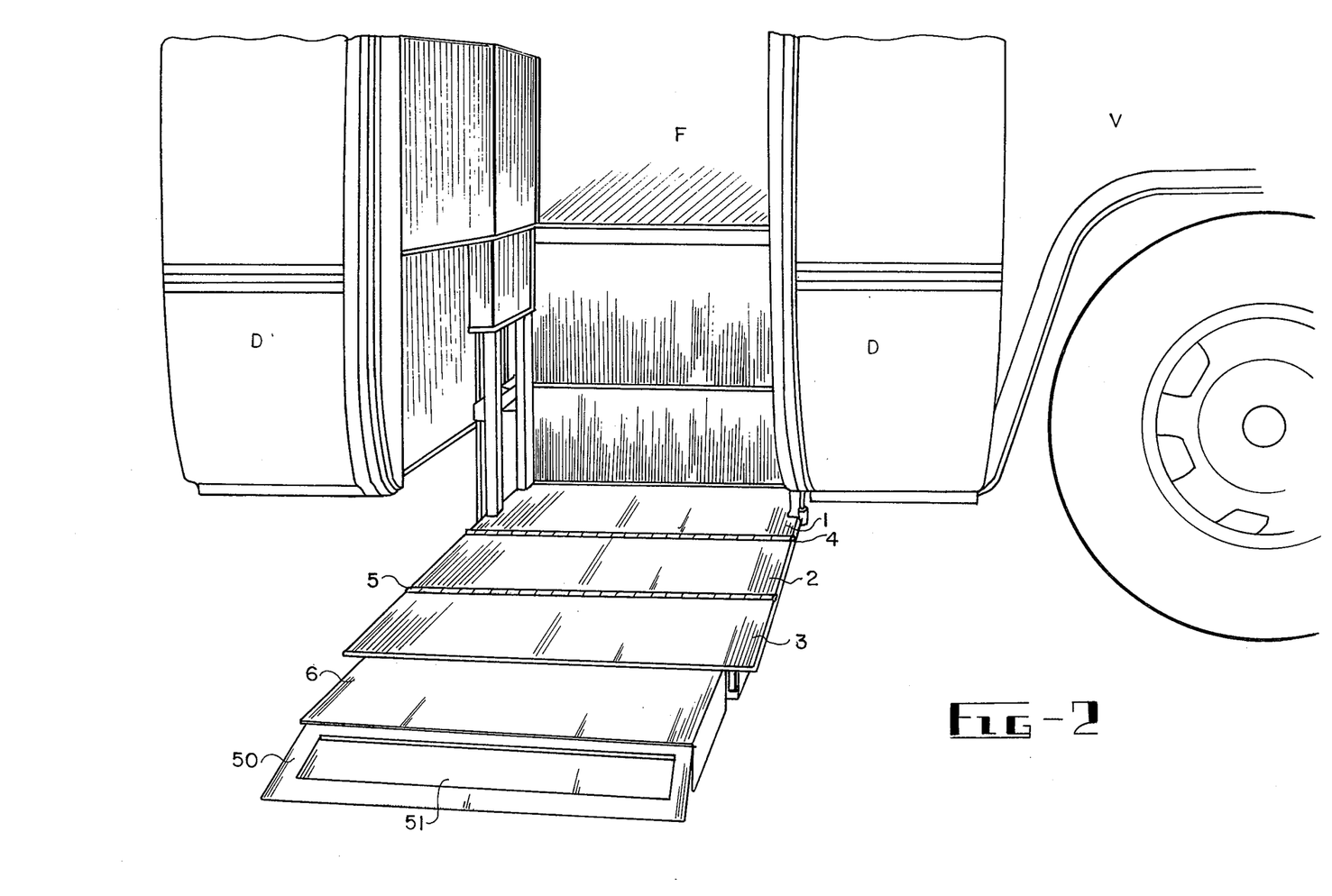
FIG. 2 is a perspective view of the invention shown in FIG. 1 in a deployed position.

In FIG. 2 the lift device is deployed in its lower position. It should be noted that the surface of platform 10 of the lift device is formed by the level section 1 of step B (which has been collapsed, that is lowered, to the level of step A), the level section of step M (which has been extended, that is shifted outward) and the joint raiser section 2 between steps A and B (which has been laid down flat). The two movable steps A and B are articulated by having all three sections 1, 2 and 3 hingedly connected along edges 4 and 5.

A retractable ramp 6, having a sloping front section 50, which is normally hidden under the steps A and B in the stowed position is extended outward to allow easy access to the platform 10.

A safety flap 51 flips upward to prevent a load such as a wheelchair from rolling backward during motion of the platform 10.

Figure 3:
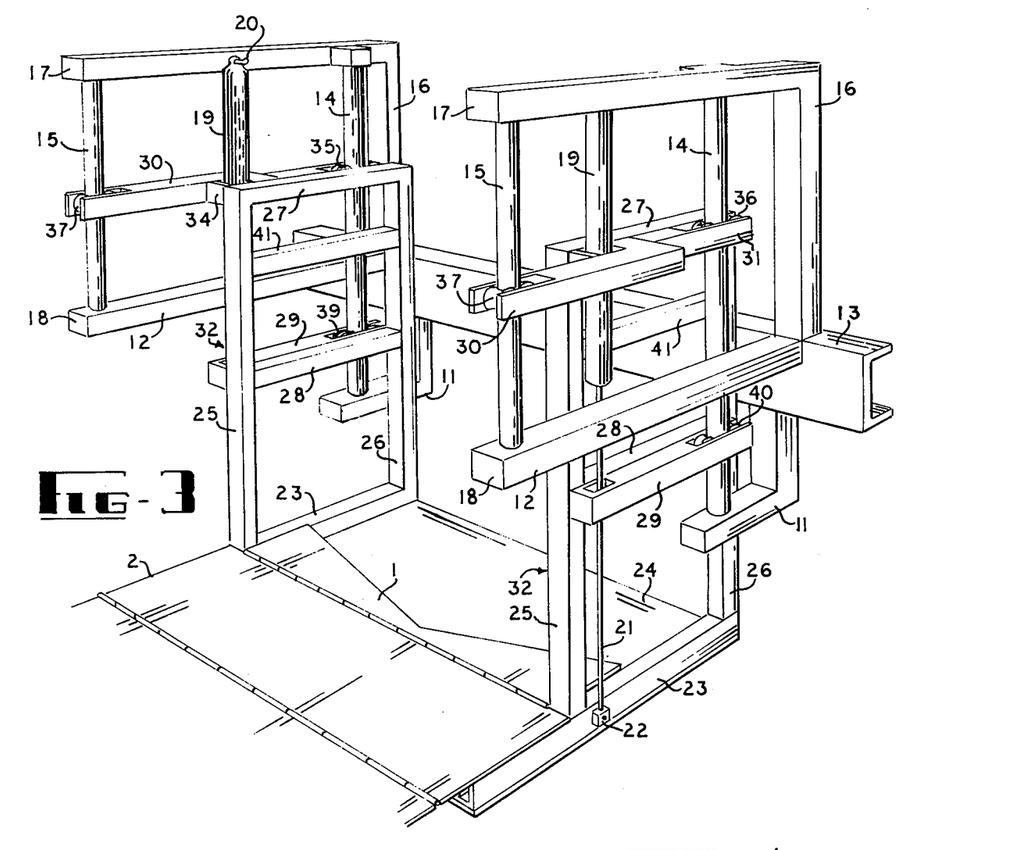
FIG. 3 is a perspective view of the supporting structure and lift mechanism in the deployed position.

Referring now to FIG. 3, the lift device comprises two pairs of horizontal girders 11 and 12 welded to the frame 13 of the vehicle V, and located at opposite sides of the doorway. Girders 11 support two vertical cylindrical rods 14 which are capped at their upper end by the horizontal section of L-shaped stanchions 16. Girders 12 are preferably anchored to the wall of the vehicle at ends 18. Stanchions 16 are anchored to the wall of the vehicle at their upper ends and to beam 13 of the vehicle at their lower ends. The vertical cylindrical rods 14 and 15 hereinafter referred to as "lifting guides," girders 11 and 12 and stanchions 16 from the supporting framework of the lift device and its stationary components.

The moving components of the lift device comprising the articulated steps A and B, the retractable access ramp 6 and associated means to form the lift platform, are mounted on a generally U-shaped carriage 32 designed to ride vertically along and between the two pairs of lifting guides 14 and 15. As more specifically shown in FIG. 4, this carriage comprises a base formed by two iron beams 23 linked by a rectangular skid plate 24 flanked by two lateral elements extending upward from the base.

Figure 4:
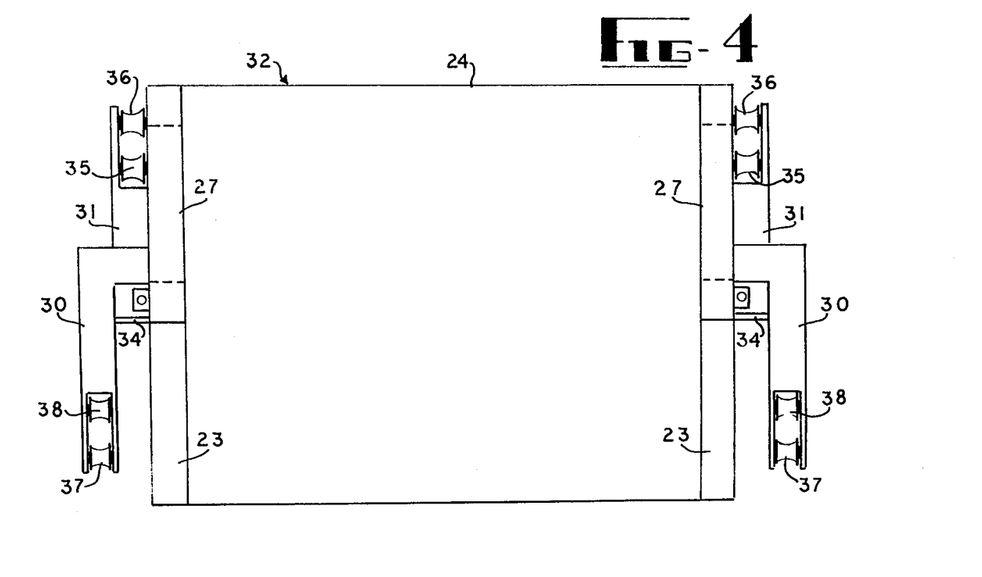
FIG. 4 is an elevational view of the lift carriage frame.

Each lateral element 15 is formed by vertical members 25 and 26 fastened to beam 23, and crossmembers 27, 41 and 28.

Each lateral element is slidably connected to lifting guides 14 at its upper end through bracket 31 at midsection through bracket 29, and to lifting guide 15 through brace 30.

Pairs of pulley shaped rollers 35 and 36, 39 and 40, 37 and 38 having good rims matching the convexity of cylindrical guides 14 and 15 are mounted within bracket 31, 29 and brace 30 respectively capturing said guides and providing a smooth and stable movement of carriage 32 vertically along and between them.

Two hydraulic cylinders 19 are connected at their upper closed ends to the horizontal sections of stanchions 16 by pin 20. Pistons moving within these cylinders under hydraulic fluid pressure are connected at their outer ends through rod 21 to beams 23 by means of pin 22 thus providing means for lifting carriage 31 along and between the lifting guides 14 and 15.

Figure 5:
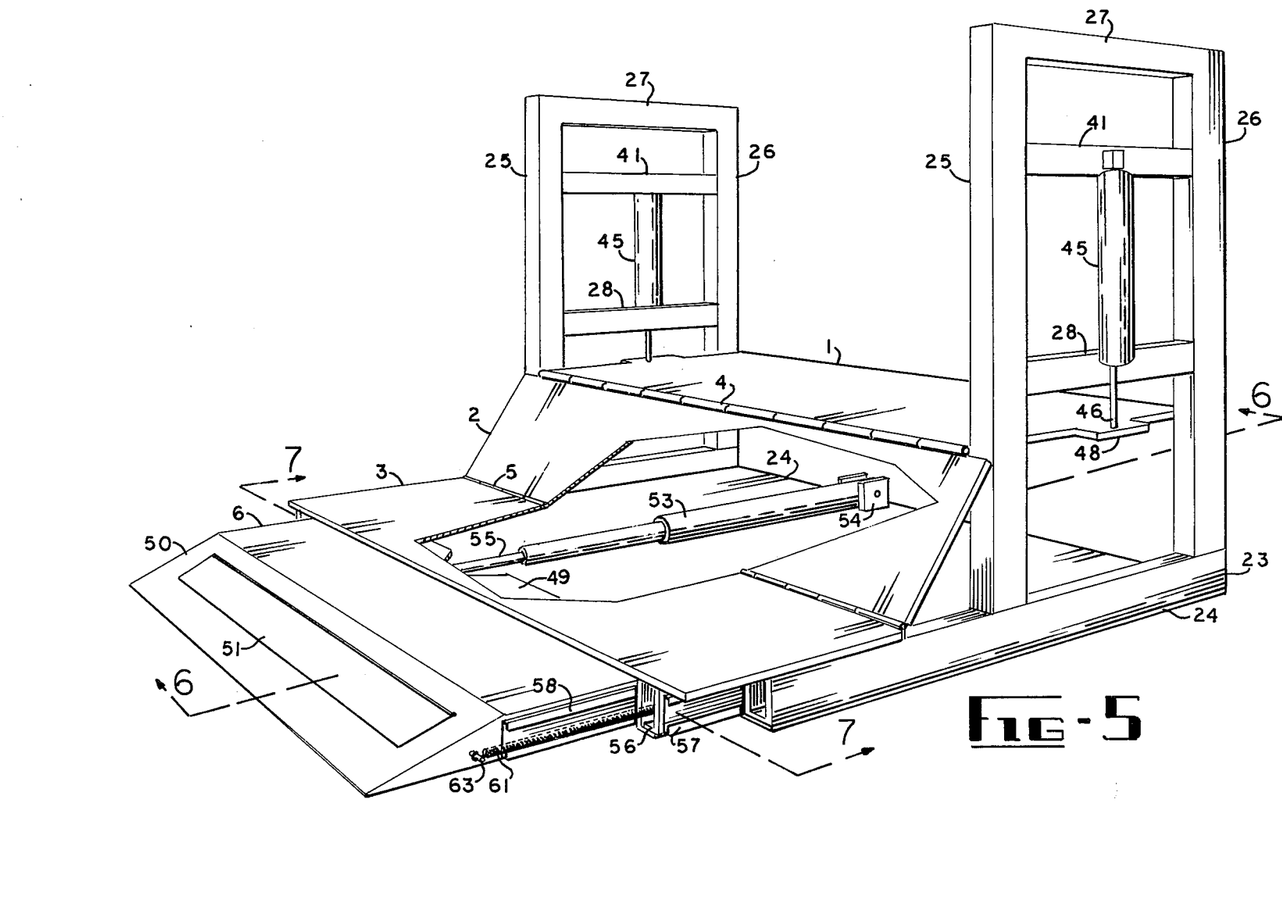
FIG. 5 is a perspective view of a part of the lift carriage, showing the platform in the process of being deployed.
Figure 6:
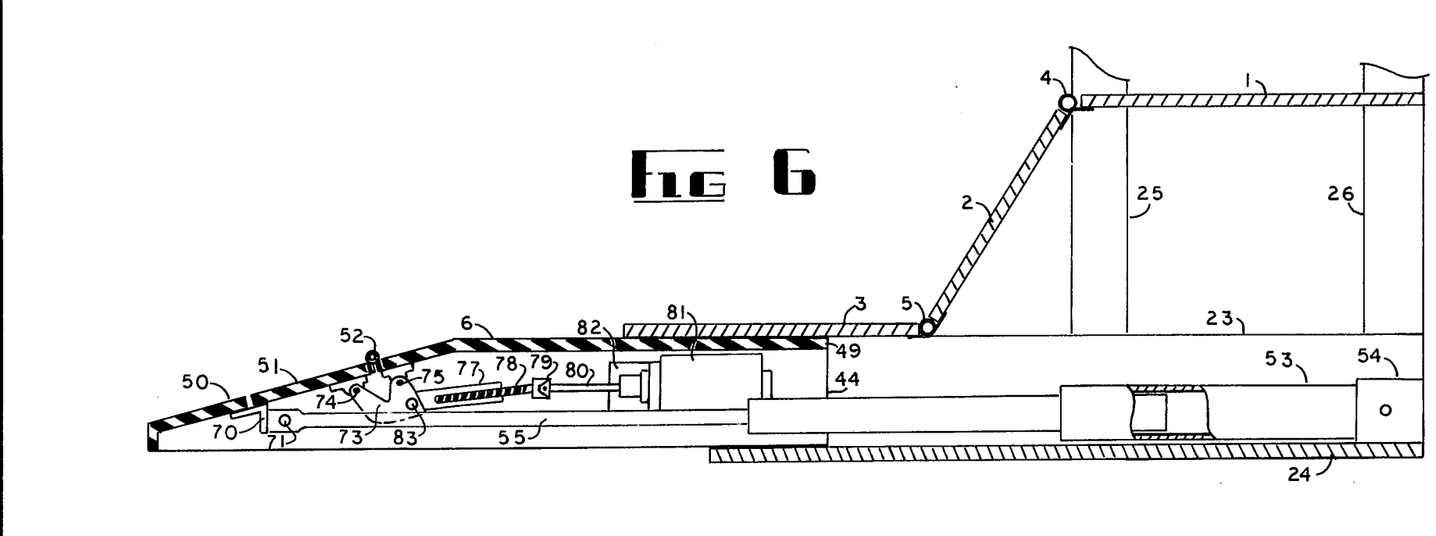
FIG. 6 is a side sectional view taken along the line 6—6 of FIG. 5.
Figure 7:
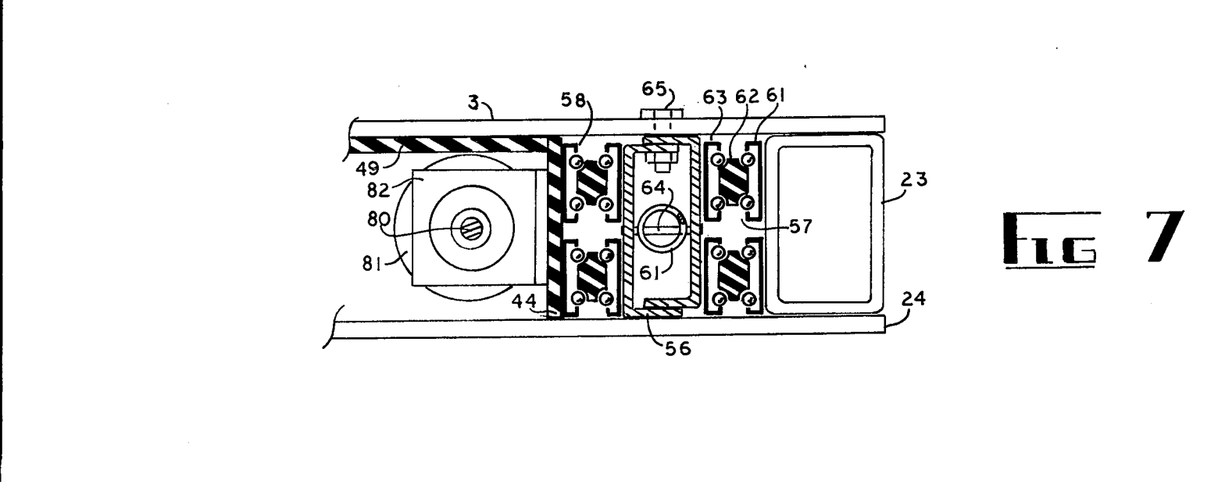
FIG. 7 is an enlarged partial front sectional view taken along the line 7—7 of FIG. 5.

Referring now to FIGS. 5, 6, and 7, the level section 1 of step B is seen riding between vertical members 25 and 26 which act as vertical guides during its collapsing motion.

Two hydraulic cylinders 45 (omitted in FIG. 3) are connected at their upper closed ends to cross-membrs 41. Pistons moving within these cylinders under hydraulic fluid pressure are connected at their outer ends through rods 46 to opposite ends 48 of level section 1 thus providing means for vertically moving step B along and between members 25 and 26.

Level section 3 of step A is fastened by bolt 65 to two parallel support beams 56 which are slidably connected to beams 23 by means of slide assemblies 57, so that beams 23 constitute two horizontal guides along and between which the level section 3 of step A can be moved. The raiser section 2 joining level sections 1 and 3 of steps A and B, being hinged at 4 and 5 along is two horizontal edges is pulled to lay down flat across beams 23 when section 1 is collapsed and section 3 is extended outward.

A retractable access ramp 6, formed by two parallel members 44 linked by a rectangular plate 49 having a outward sloping area 50, is housed under level section 3 of step A and slidably connected to beams 56 by means of slides assemblies 58.

A pair of coil springs 61 (omitted in FIG. 2), anchored to the inside of beams 56 by pins 64 are tied to opposite sides of ramp 6 by pin 63. A hydraulic cylinder 53 is connected at its closed end to skid plate 24 by means of bracket 54. Telescopic pistons moving within the cylinder 53 under hydraulic fluid pressure are connected to ramp 6 through rod 55.

As more particularly shown in FIG. 6 rod 55 is connected to the sloping area 50 of ramp 6 by means of pin 71 mounted in bracket 70.

Flap 51 lies within a cut-out in the sloping area 50; its upper edge being fastened by a hinge 52 to the sloping area 50. Its lower edge resting upon a section of bracket 70.

Near each of its shorter edges a crescent shaped lever 73, rotating around pin 75 is tied to flap 51 by pin 74.

An electrical motor 81 mounted against beam 23 by bracket 82 have their shaft 80 connected to a threaded rod 78 by means of universal joint 79. The threaded rod 78 engages a threaded tubular member 77 which is itself pivotally connected to lever 73 by pin 83.

The slidable connection between the extensible step 3 and carriage 21, and between the ramp 6 and the extensible step 3 are more particularly shown in FIG. 7.

Slides 57 and 58 are made of standard slide assemblies well known to persons skilled in the mechanical arts and used in a variety of commercial and industrial applications to provide a low friction slidable coupling between mechanical structures. These slides are commercially available under various trade names and generally comprise two outer member channels 61 and 63 capturing a common inner member 62 between rows of ball bearing.

Two parallel slides units are used in slides 57 and 58 in order to provide for a higher load rating of the lift.

Grooved plastic or rubber mats are preferably used to cover the steps and ramp surfaces for safety purposes.

The means for operating the hydraulic cylinders, such as those used in this invention, are well known to people skilled in the mechanical arts, and comprises a source of pressurized fluid, such as a pump, and various conduits for feeding the pressurized fluid to manually or solenoid controlled valves. The valves, in turn, direct the flow of pressurized fluid into the cylinders on either sides of the pistons, so as to control the movement and direction of the pistons within the cylinders. Solenoid controlled valves also having manual lever control are preferably used in the present invention, and in combination with the cylinders and associated means, constitute the electro-hydraulic powered means to operate the lift.

Figure 8:
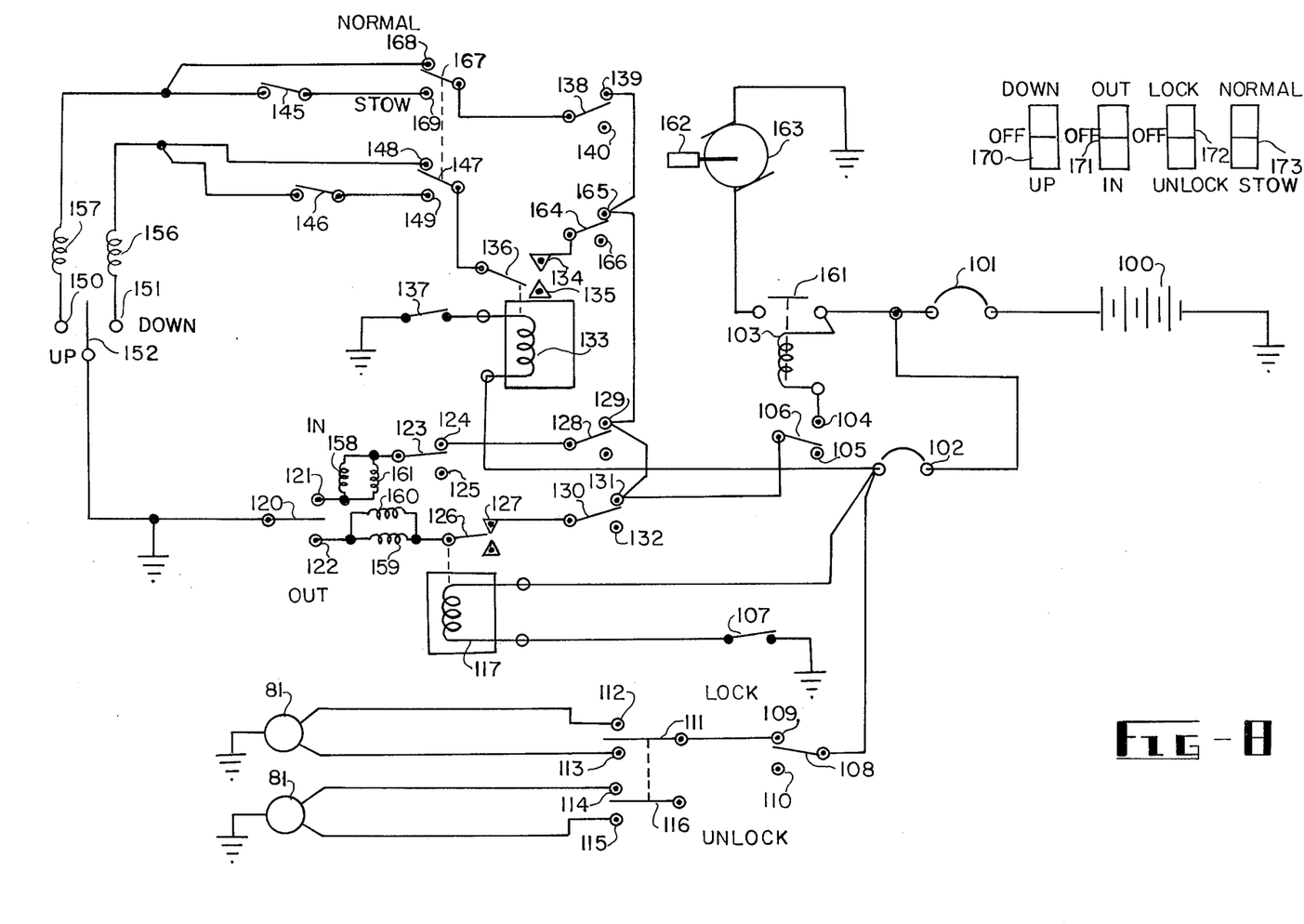
FIG. 8 is a schematic of the electrical system.

Referring now to FIG. 8, in addition to the other drawings, I shall describe the operation of the lift device.

The lifting motion of cylinders 19 (FIG. 3) is controlled by valve solenoid 157; the lowering action being controlled by valve solenoid 156.

The outward deploying motion of cylinder 53 (FIG. 5) is controlled by valve solenoid 159; the inward retracting action by valve solenoid 158.

The step lowering motion of cylinder 45 (FIG. 5) is controlled by valve solenoid 160, and the step raising motion by valve solenoid 161.

The electrical power supply comprises the vehicle battery 100 protected by circuit breakers 101 and 102.

Manual switches 170, 171, 172, 173, are accessible from the driver's seat or from the entrance area of the vehicle, and allow the driver or the lift user to control the operation of the lift. Switches 170, 171, and 172 are preferably of a momentary type which return to the off position when released.

A three-position switch 170 controls the position of the common 152 and is used to raise or lower the carriage 32. A three position switch 171 controls the position of the common 120 and is used to deploy or retract the platform 10. A three position switch 172 controls the position of commons 111 and 116, and is used to raise or lower the wheel chair stop flap 51. A two position switch 173 controls commons 147 and 167 and is used to return the lift to its stowed location.

While the switch 173 is in the NORMAL position, holding switch 170 to the DOWN position energizes the valve solenoid 156 through contacts 147–148, 136–134, 164–165, and 106–104. Coil 103 of the pump control solenoid switch 161 is energized and the pump 163 is started, causing the lowering of the carriage 32 by cylinders 19.

Holding the switch 170 in the UP position energizes the valve solenoid 157 through contacts 167–168, 138–139, and 106–104. The pump 163 is similarly started and the platform 10 is developed by extending step section 3 and ramp 50 under action of cylinder 53, while step section 1 is lowered under simultaneous action of cylinders 45.

Holding the switch 171 in the IN position energizes the valve solenoids 158 and 161 through contacts 123–124, 128–129, and 106–105. The pump 163 is similarly started, and the ramp 10 and the step section 3 are retracted under action of the cylinder 53, while the step section 1 is raised under simultaneous action of the cylinders 19.

While the switch 172 is held in the LOCK position, electrical motors 81 are started in a clockwise direction (in reference to FIG. 7) through contacts 111–112, 116–114, and 108–109. The threaded rod 78 (FIG. 6) is extracted from element 77 by an unscrewing motion, pushing lever 73 around pivoting pin 75, thus causing flap 51 to rotate upward around hinge 52.

While the switch 172 is held in the UNLOCK position, the rotation of motors 81 is inverted through contacts 111–113, 116–115, and 108–110.

The resulting forward rotation of the threaded rod 78 retracts element 77 causing the flap 51 to return toward its DOWN position.

The various mechanical motions just described are further controlled through the following switch means. In most public transit vehicles, the door opening mechanism is interlocked with the braking system in order to prevent accidental opening of the vehicle while it is in motion. Therefore, in order to block the operation of the lift device while the doors are closed or the vehicle is moving, the electric power supply is run through a pole of the vehicle door interlock switch whose common 106 contacts with position 104 only when the door is fully open.

A down limit switch actuated when rods 21 (FIG. 3) reach the maximum extension opens contact 164–165 thus stopping pump 163. An up limit switch, actuated when the platform 10 reaches the level of the vehicle floor F opens contact 138–139 in order to stop further lifting action of platform 10. An outward limit switch actuated when the platform 10 is fully deployed, opens contacts 130–131 stopping the deployment operation.

An inward limit switch, actuated when the platform 10 is fully retracted opens contact 128–129 in order to stop further retracting of the platform 10. A mat-type contact switch, located under the skid plate 24, and actuated whenever the platform touches ground or an obstacle, closes contact 137 energizing the coil of obstruction relay 113, and causing contact 136–134 to open. This interrupts further downward motion of the platform 10.

A flap-down limit switch actuated when the wheel chair stop flap 51 is down, closes contact 123–124 in order to allow retraction of the ramp 50 only when the flap 51 is lowered.

A ramp-out limit switch actuated when the ramp is fully extended closes contact 108–109 in order to prevent raising the stop flap 51 while the ramp 50 retracted.

A stowed position switch actuated when the carriage 10 reaches the normal step position opens contacts 145 and 146, stopping further upward or downward motion of the carriage when switch 173 is in the STOW position.

A tape switch located along the outward edge of ramp 6 and actuated whenever the ramp hits and obstacle, closes contact 107, energizing the coil of relay 117, thus opening contact 126–127 and preventing any further extension of the platform 10. The standard sequence of operation is generally as follows. After opening the door D of the vehicle V, hand flipping 173 to the NORMAL position, the deiver holds switch 170 in the DOWN position until the carriage 32 touches ground. After releasing switch 170, he holds switch 171 in the OUT position until the platform 10 and ramp 6 are fully deployed. After the loading of the wheel chair onto the platform 10 the flap 51 is raised by holding switch 172 in the LOCK position for a short while.

The platform 10 is raised to the level of the vehicle floor F by holding the switch 170 in the UP position. After entry of the wheel chair into the vehicle, switch 73 is returned to the STOW position. The flap 51 is lowered by holding switch 172 in the UNLOCK position. The carriage 32 is lowered to the stow away level by holding switch 170 to the DOWN position and the platform 10 is retracted into the stowed step position by next holding the switch 171 on the IN position. The sequence of operation may be appropriately reversed to lower a wheel chair from the vehicle floor to the ground. The carriage 32 may also be lowered or raised without unfolding the steps A and B into a platform.

A lever 162 is mounted on pump 163, along with manual control of the valves, to operate the lift device in case of electric power failure. The pump itself is preferably located near the entrance and/or control switches.

While I have described one embodiment of the present invention, many variations may be suggested without departing from the scope of the invention. For instance, an electro-hydraulic power means could be used to control the operation of the wheel chair stop-flap rather than the motor means described here. In some applications where only one or two steps are required, the collapsiable intermediary step B could be completely omitted.

Figure 9:
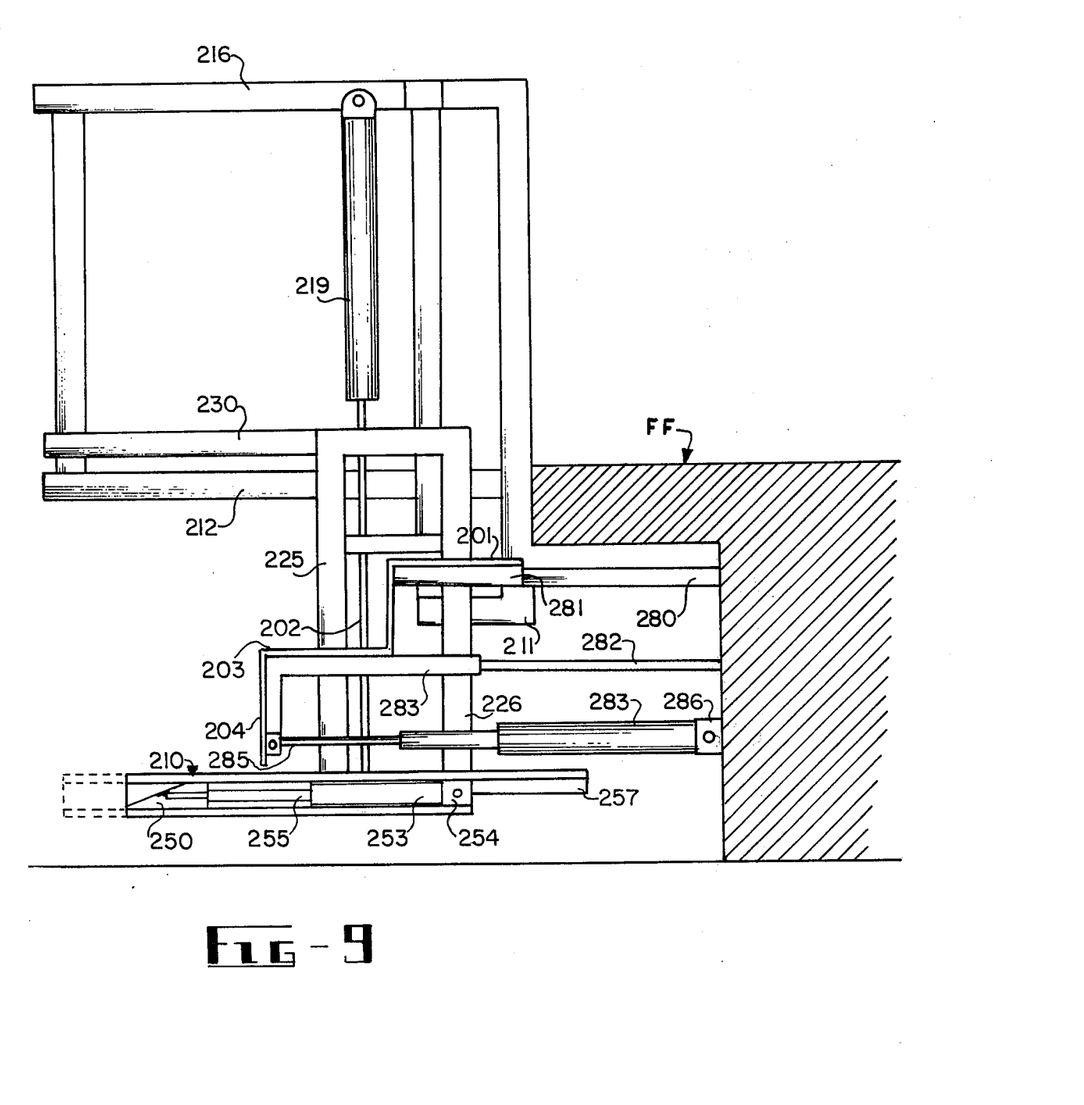
FIG. 9 is a sectional view of a modified version of the preferred embodiment.

In other applications, particularly where the number of stpes is in excess of three, it might be found convenient to withdraw or retract the intermediary steps under the floor of the vehicle, rather than collapsing such steps into a platform. Instead, an elongated version of the lower step, extending beneath the retractable steps constitutes the lift platform. FIG. 9 illustrates a version of the latter application. The supporting structure is unchanged, but the carriage is modified as follows. The surface 201, 202, 203, and 204 of two intermediary steps are mounted on slide elements 281 and 283. The reciprocal slide elements 280 and 282 respectively acting as horizontal guides are mounted under the upper landing part of stairway structure FF.

An hydraulic cylinder 283 tied at its closed end to the inward area of the understructure, can withdraw or retract the intermediary step beneath the upper landing of the stairway, thus clearing the way for the ascension of the lift carriage. The carriage is constituted by elements 225, 226, and the lift platform 210.

The lift platform 210 has an elongated surface plate, extending beyond vertical element 226 under the stairway structure, and connected to slide 257 (in the same manner by which step section 3 of step B was connected to slide elements 57 through beams 56 in the previous described version of the device).

An hydraulic cylinder 253 is used to extend the surface plate 257 and the ramp 250. Once the lower step platform 210 has been extended outward, it can be well understood that said platform can be raised by means of an hydraulic cylinder 225. The cylinders 225, 283, and 253 are elements of electro-hydraulic powdered means similar to the means for lifting and the means for extending the extensible step in the previously described application.

It will be apparent to those skilled in the art that other variations may be made in the details of construction and application without departing from the spirit and scope of this invention as defined in the pending claims.

What is claimed is:

1. The combination with a stairway structure of a plurality of movable steps cooperating to form a lift platform which comprises:
 a collapsible step;
 an extensible step;
 a joint raiser section hingedly connected to said collapsible step and extensible step;
 a pair of vertical guides disposed respectively at opposite ends of the collapsible step;
 means for vertically moving the collapsible step along and between the vertical guides;
 a pair of horizontal guides disposed respectively at opposite ends of the extensible step;
 means for horizontally and outwardly moving the extensible step along and between the horizontal guides;
 a pair of vertical lifting guides disposed respectively at opposite sides of the stairway structure; and
 means for moving the collapsible step, and the extensible step, together along the lifting guides between the lower and upper levels of the stairway structure.

2. The combination claimed in claim 1 wherein: said several means for moving comprise electrohydraulic powered means; and manually powdered means.

3. The combination with a stairway structure at the entrance of a vehicle of a lift comprising:
 a supporting framework comprising a plurality of vertical cylindrical guides mounted at opposite sides of the vehicle entrance and supported and anchored to the frame of the vehicle by a plurality of girders and stanchions;
 a U-shaped carriage comprising
 a pair of parallel beams linked by a horizontal skid-plate flanked by two upward extending lateral elements; the carriage supporting:
 a collapsible step surface and an extensible step surface hingedly connected to their joint raiser section, the extensible step surface slidably connected to the parallel beams;
 a retractable access ramp, housed under the extensible step and slidably connected to it, having a wheel chair stop flap hingedly connected to it and an electrical motor means for raising and lowering the flap;
 electro-hydraulic power means for outwardly and inwardly moving the ramp and the extensible step;
 a pair of coil springs stretched between the opposite sides of the ramp respectively and the extensible step for retracting the ramp under it;
 electro-hydraulic powered means for moving the collapsible step surface along and between the lateral elements;
 a plurality of pairs of pulley shaped rollers having grooves rims matching the convexity of the cylindrical guides, capturing the guide to rovide a sliding movement of the carriage vertically along and between them;
 electro-hydraulic powered means for lifting and lowering the carriage between ground and vehicle floor;
 a plurality of electric switches for controlling the operation of the electro-hydraulic powered means;
 a plurality of contact switches mounted under the carriage on the outward edge of the ramp and in the door opening mechanism of the vehicle for safely stopping the operation of the lift upon contact with an obstacle, and when the doors are not fully opened.

* * * * *